(No Model.)

E. J. HOUSTON & A. E. KENNELLY.
METHOD OF AND APPARATUS FOR MEASURING ILLUMINATION.

No. 552,371. Patented Dec. 31, 1895.

WITNESSES:

INVENTORS
E. J. Houston and
A. E. Kennelly

UNITED STATES PATENT OFFICE.

EDWIN J. HOUSTON AND ARTHUR E. KENNELLY, OF PHILADELPHIA, PENNSYLVANIA.

METHOD OF AND APPARATUS FOR MEASURING ILLUMINATION.

SPECIFICATION forming part of Letters Patent No. 552,371, dated December 31, 1895.

Application filed February 13, 1895. Serial No. 538,210. (No model.)

*To all whom it may concern:*

Be it known that we, EDWIN J. HOUSTON and ARTHUR E. KENNELLY, of the city and county of Philadelphia, State of Pennsylvania, have invented a certain new and useful Method of and Apparatus for Measuring Illumination, whereof the following is a specification, reference being had to the accompanying drawings.

The object of our invention is to provide an organized method and apparatus whereby the actual illumination in any region—i. e., the quantity of light received per unit of surface area—can readily be measured and its effective value be determined.

The human eye is of course the ultimate criterion in every practical method of comparing sources of light, and we have found by careful experiment that the range of illumination which corresponds to the difference between indistinctness and accurate delineation of an object to the eye is quite narrow. We have also found by experiment that the amount of illumination required to render any object distinctly visible, though varying with the character and color of the object, as well as with the character and color of its background, is for a given object and background practically definite.

We employ as our unit of illumination the amount of light required to be received by a definite test object placed in a darkened chamber at a definite distance from the eye in order to enable it to be clearly delineated to the eye. We illumine the test object by means of definitely diffused light, as distinguished from light which is directly radiated without modification from a primary source of illumination. Such diffusion may be obtained by reflection from a suitable surface, or by transmission through a translucent medium, the efficient area of the diffusing element being in each instance determinate, and the illumination itself bearing a definite relation to the test object. For convenience, we prefer to designate this diffusing element as the "secondary illuminator," since for our purposes it may be considered as practically a source of light in itself. Means are provided whereby the secondary illumination can be definitely modified to a degree corresponding with the limit of visibility of the test object, and the extent of such modification compared with a standard.

We will now describe, by reference to the accompanying drawings, a typical apparatus adapted to the practice of our method.

Figure 1:
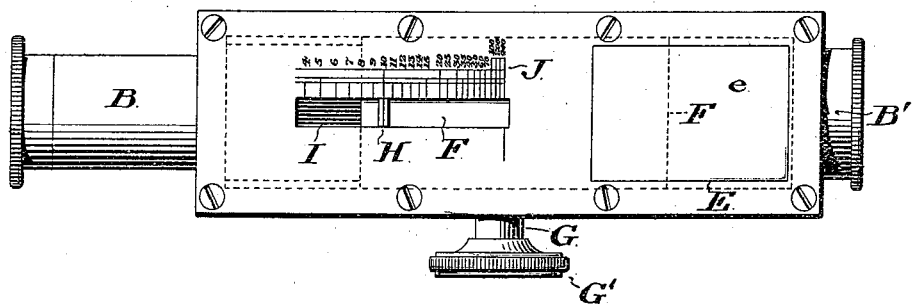
Figure 2:
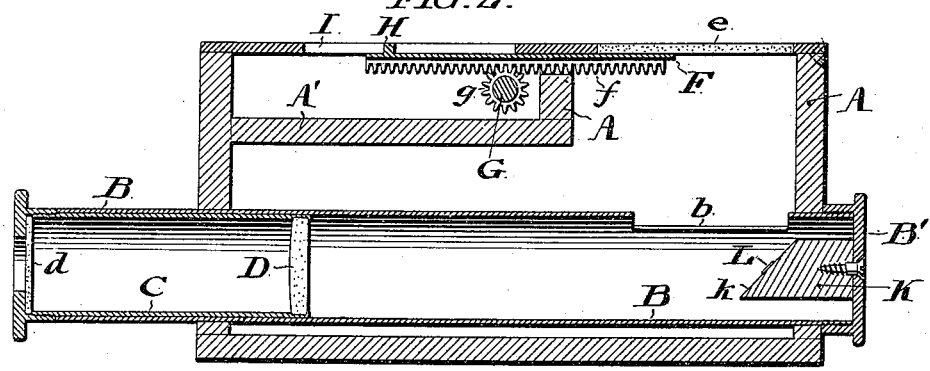
Figure 3:
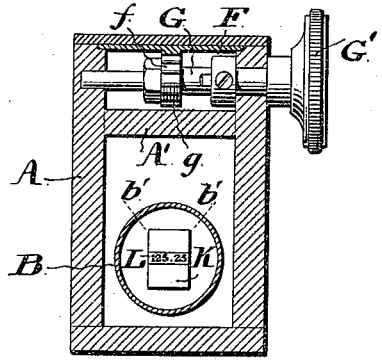

In said drawings, Figure 1 represents a top or plan view of such apparatus, and Figs. 2 and 3 are respectively a longitudinal vertical section and a transverse vertical section through the same.

A represents a small rectangular box, through the lower portion of which a tube B runs longitudinally. One end of said tube is provided with a telescoping tubular piece C, having a lens D and eyepiece d to adapt the apparatus to individual abnormalities of vision. The opposite end of the tube B is provided with a removable cap B', to which is centrally attached a block K, having its inner face k inclined at an angle of substantially forty-five degrees and carrying a test object L, which may be a slip of paper containing figures, letters, or any other definite and recognizable mark. For a short distance adjacent to the inclined face of the block K the outer portion of the tube B is cut away or slotted, as indicated at b, the radial extent of the slot being indicated in Fig. 3 by the dotted lines at b' b'. In the top of the box is a rectangular window E, which is covered with a plate of translucent material, such as porcelain, adapted to diffuse with practical uniformity light transmitted through it to the interior of the box A. A sliding shutter F is mounted in suitable ways, extending longitudinally along the interior of the top of the box, said shutter being provided with a rack f on its under side, engaging with a spur-pinion g, mounted upon the shaft G, which extends transversely through the box and is provided with an external actuating-disk or milled head G'. The extent of the rack f and the size of the shutter F are such that said shutter can be shifted, so that in one extreme position it entirely closes the window E, and in the other extreme position exposes the entire area of the same. The top of the box is slotted longitudinally to an extent corresponding with the range of movement of the shutter, as indicated at I, and an index H is mounted upon the top of the shutter and extends upwardly through said slot. One or both sides of the slot are graduated, as indicated at J, in such manner that the position of the index H can be accurately noted.

To prevent access of light to the interior of the box A, through the slot I, the subjacent portion of the box is inclosed by a horizontal partition A' and vertical partition A², so arranged as to inclose the actuating mechanism of the shutter while permitting the described movement thereof.

If this instrument be placed in an illuminated region, the shutter F being retracted so as to admit light through the diffusing medium e of the window E, the test object L will be illumined by the diffused light transmitted through the translucent plate e, which thus becomes the secondary illuminator. The telescoping eyepiece is then focused upon said test object, so as to obtain a well-defined image of the same. The shutter F is then shifted across the window until the limit of visibility of the test object has been reached. The exposed area of the secondary illuminator, which corresponds with this limit of visibility, can then be noted by reference to the position of the index H, and comparison of such area can be made with a determinate standard.

The total illumination which falls upon the surface of the window in any fixed position is the sum of all the luminous intensities which fall upon it at all angles of incidence, multiplied respectively into the cosine of each angle. We have found that from any element of the window's surface the total quantity of light diffused downward into the dark box or chamber is proportional to the illumination of said element. Consequently, the illumination which the test object receives is proportional to the total illumination of the window, and the limiting surface area of window which will enable the test object to be just legible is, therefore, a measure of the total illumination of the surface of the window.

In order to calibrate the indications of the instrument, it will be sufficient to expose it to known illuminations, as in any suitable photometer, and to mark upon the scale J relative measurements in correspondence with the degrees of such known illuminations. Thus, supposing that the total area of the secondary illuminator to be four multiplied by two equals eight square centimeters, and that when this window is exposed in the photometer so that it receives an illumination of one unit—say one candle-foot, or one carcel-meter, or one lux—and when the shutter is so closed that the characters on the test object are just legible, the area may, with suitable secondary illuminator and suitable test object, be two multiplied by two equals four square centimeters. Then, if when the instrument is held in any position in an unknown illumination, it is found necessary to expose only two square centimeters of surface in order to obtain legibility, the illumination on the window of the instrument would be two units, and, similarly, if one-eighth of a square centimeter remained unexposed at the limit of legibility in another instance the illumination on the window would then be thirty-two units.

From the ready portability of this instrument and the facility with which its observations can be conducted in a lighted space, affording as it does a light-tight chamber in which the test object is exposed, it is evident that the instrument possesses advantages over all others yet devised for the measurement of illumination. Moreover, since the instrument can be calibrated once for all in any standard units of illumination by determining the area of the aperture in a window required to attain the limit of legibility, the instrument is necessarily simplified. It may, however, at times be advantageous to check the observations made, by recomparison in the photometer, and this is especially desired in case the instrument changes hands.

In order to check the calibration of the instrument and give the observer an opportunity to determine whether his observations are reliable, the test object may be replaced by another of the same general character—i. e., one equally legible under an equal illumination.

The test object may consist of fine printing on any suitable background, or of engraved lines, or of devices of any kind requiring an adequate illumination for their proper appreciation, the character depending upon the nature and magnitude of the illumination to be measured.

When so desired, the position of the block K and the angle of inclination of the object may be varied.

The instrument is available for determining the intensity of the illumination at different distances from a source of light, so as readily to ascertain whether the best distribution of light has been secured. The instrument may, therefore, be applied for determining the illumination produced at a measured distance from a single source of light, such as an incandescent lamp whose candle-power is to be determined, and from the illumination measured the candle-power can be calculated. Thus, suppose it is desired to determine whether an incandescent lamp, which has been in use for some time, and whose filament is presumably thinner, with the lamp-globe evidently blackened, is emitting light below a certain candle-power, then without removing the lamp from its socket it will be sufficient to place any non-reflecting object behind the lamp, such as a black cloth, and to place the instrument at a fixed distance—say two feet—from the lamp, care being taken to avoid any appreciable quantity of light from any other source falling on the secondary illuminator. If the instrument then shows, when the window is approximately perpendicular to the rays of light from the lamp, that the illumination on its surface is four candle-feet, then the intensity of the lamp will be approximately sixteen candles; or where greater accuracy is required, a special darkened box may be employed, about two feet long, at one end of which is placed the lamp to be measured, while at the other end is placed the window of the illuminometer. Our illuminometer, therefore, constitutes in itself an indirect photometer for conveniently determining the intensity of any light whatever. We also apply the general principles of our invention to the determination of the illumination received from certain celestial objects in the astronomical telescope. Here the test object may be placed so as to receive the illumination from the object-glass of the instrument. The secondary illuminator—say a diaphragm of ground glass—is inserted in the pathway of the rays from the object-glass to the test object. By the aid of an eyepiece a shutter or diaphragm can be arranged to reduce the effective area of secondary illumination until the test object is just visible in the light from this diaphragm. The same principle of our invention may also be applied to opthalmalogical measurements—for example, in determining the power of the eye, in order to detect irregularities of vision—such, for example, as a gradually-increasing cataract or opacity of the cornea. In such cases the illumination at the surface of a suitable test object could be measured by a normal eye when the test object is legibly discerned by the eye under examination.

In the foregoing description we have described the secondary illuminator as consisting of a translucent plate and the means for modifying the secondary illumination as a shutter. It is evident, however, that without departure from the principle of our invention a reflecting-surface of proper character could be employed as the diffusing medium, and that the necessary variation of the secondary illumination could be accomplished in various ways, such as the interposition (in the path of the rays falling upon the test object or in the rays transmitted thence to the eye of the observer) of a translucent wedge or of a refracting element, such as a pair of Nicol's prisms, the only absolute requisite for the modifying element being that it shall have the capacity of gradually and definitely obscuring the test object. Hence in our method claim we do not limit ourselves to the employment of any particular apparatus, nor do we, in our broader claims for the apparatus, limit ourselves to elements of the precise nature above shown and described, since the equivalents thereof may be found in a widely-extended range.

We are aware that it is not new, in a photometer, to use a translucent wedge for gradually obscuring the rays of light from the primary source of illumination, and we do not therefore claim the use of such wedge except in so far as it is an element of our combination claims, or its employment is an incident to our method. So far as we are aware, however, no prior device has embodied the proper conditions which are characteristic of our invention, since for the obtaining of useful results by instruments heretofore known it was practically necessary that the apparatus should be directed toward the primary source of light, and no definite or useful measure of general illumination in a given region could be effected thereby. The fact that our apparatus is susceptible of use as a photometer, or direct measurer of the intensity of a source of light, does not render its mode of operation similar to that of ordinary photometers, one fundamental distinction between our method and apparatus and those previously used lying in the fact that photometers proper are so constructed as to exclude, as far as possible, general illumination and restrict the entering rays to a comparatively limited group, while in our invention the purpose is as far as possible, consistently with the size of the apparatus, to direct upon the test object a relatively large number of rays in order to obtain what may be considered as a fair average of illumination in a given region. This distinction is absolutely important for the measurement of illumination and is, so to speak, undesirable in an instrument which is intended to be used for a photometer only.

Having thus described our invention, we claim—

1. The hereinbefore described method of measuring illumination, which method consists in definitely diffusing the effective light in a given region by means of a secondary illuminator; exposing a test object in definite relation to such diffused secondary illumination only; definitely obscuring the test object to the limit of visibility; and comparing with a standard, that condition of illumination of the test object which corresponds with the limit of visibility of said test object, substantially as set forth.

2. The combination of an inclosed chamber having a definite aperture for the restricted admission of light; a secondary illuminator, substantially as set forth; a test object arranged within said chamber in definite relation to said secondary illuminator and exposed to the secondary illumination only; means substantially as set forth for permitting inspection of the test object; and means substantially as set forth for obscuring the test object to the limit of visibility.

3. The combination of a closed box having an aperture for the restricted admission of light; a secondary illuminator arranged in the described relation to said aperture; a test object arranged within said box in definite relation to said secondary illuminator and exposed to secondary illumination only; an aperture for permitting inspection of the test object; and means substantially as set forth for reducing the secondary illumination to the limit of visibility of the test object.

4. The combination of a light-proof box, having an aperture for the restricted admission of light; a plate of translucent material covering the said aperture; means substantially as set forth for reducing the area of said aperture; a test object arranged within said box in definite relation to said plate and exposed to the illumination through said translucent material; and means substantially as set forth for permitting inspection of the test object.

EDWIN J. HOUSTON.
A. E. KENNELLY.

Witnesses:
 JAMES H. BELL,
 RANDOLPH SAILER.